(12) United States Patent
Albero et al.

(10) Patent No.: US 12,500,951 B1
(45) Date of Patent: Dec. 16, 2025

(54) SYSTEM AND METHOD FOR AUTOMATED SYNCHRONIZATION OF DATA

(71) Applicant: Bank of America Corporation, Charlotte, NC (US)

(72) Inventors: George Albero, Charlotte, NC (US); Naga Vamsi Krishna Akkapeddi, Charlotte, NC (US); Saurabh Arora, Gurugram (IN)

(73) Assignee: Bank of America Corporation, Charlotte, NC (US)

( * ) Notice: Subject to any disclaimer, the term of this patent is extended or adjusted under 35 U.S.C. 154(b) by 21 days.

(21) Appl. No.: 18/676,680

(22) Filed: May 29, 2024

(51) Int. Cl.
  *G06F 15/16* (2006.01)
  *G06F 9/54* (2006.01)
  *H04L 29/06* (2006.01)
  *H04L 67/1095* (2022.01)
  *H04L 67/5651* (2022.01)

(52) U.S. Cl.
  CPC ...... *H04L 67/1095* (2013.01); *H04L 67/5651* (2022.05)

(58) Field of Classification Search
  CPC .............. H04L 67/1095; H04L 67/5651
  USPC ................................................... 709/248
  See application file for complete search history.

(56) References Cited

U.S. PATENT DOCUMENTS

| | | | |
|---|---|---|---|
| 7,325,042 B1 * | 1/2008 | Soscia | G06F 16/27 709/219 |
| 7,933,296 B2 | 4/2011 | Augustine et al. | |
| 8,694,465 B2 | 4/2014 | O'Farrell et al. | |
| 8,764,555 B2 | 7/2014 | Quan et al. | |
| 9,106,721 B2 | 8/2015 | Quan | |
| 9,529,657 B2 | 12/2016 | Jan et al. | |
| 9,619,406 B2 | 4/2017 | Dalal | |
| 10,025,836 B2 | 7/2018 | Batchu et al. | |
| 10,853,058 B1 * | 12/2020 | Ouzan | G06F 8/71 |
| 11,556,658 B2 | 1/2023 | Schvey et al. | |
| 2002/0046286 A1 * | 4/2002 | Caldwell | H04L 67/1095 709/229 |
| 2007/0143357 A1 * | 6/2007 | Chaudhri | H04L 67/1095 |
| 2009/0196311 A1 * | 8/2009 | Khosravy | H04W 8/30 370/503 |
| 2009/0234850 A1 * | 9/2009 | Kocsis | G06F 16/213 |
| 2011/0119403 A1 | 5/2011 | Ozzie et al. | |
| 2012/0117598 A1 * | 5/2012 | Pons | H04N 21/47214 725/40 |
| 2012/0290441 A1 * | 11/2012 | Mahaniok | G06F 16/24 705/26.62 |

(Continued)

*Primary Examiner* — Hamza N Algibhah (57) ABSTRACT

A system and method for synchronizing data changes. The system is configured to receive a notice from a client device that the client device has updated data and request metadata related to the updated data from the client device that indicates at least a type of data associated with the updated data. The system compares the metadata with first application information and second application information to determine if the first external application or the second external application uses the type of data indicated in the metadata and causes the updated data to be communicated to the first external application but not the second external application when the first external application uses the type of data indicated in the metadata but the second external application does not use the type of data indicated in the metadata.

20 Claims, 3 Drawing Sheets

(56) References Cited

U.S. PATENT DOCUMENTS

| | | | |
|---|---|---|---|
| 2016/0044103 A1* | 2/2016 | Seo | H04L 67/60 |
| | | | 709/201 |
| 2016/0099963 A1* | 4/2016 | Mahaffey | H04L 63/166 |
| | | | 726/25 |
| 2017/0017551 A1* | 1/2017 | Nichols | H04L 67/1095 |
| 2017/0237794 A1 | 8/2017 | Jarvi et al. | |
| 2017/0251056 A1* | 8/2017 | Boston | G06F 16/275 |
| 2017/0302449 A1 | 10/2017 | Wagner et al. | |
| 2018/0005186 A1 | 1/2018 | Hunn | |
| 2020/0310899 A1* | 10/2020 | Kelam | G06F 11/0784 |
| 2021/0073285 A1 | 3/2021 | Hunter | |
| 2021/0103254 A1* | 4/2021 | Grosch | G06F 11/1675 |
| 2021/0201328 A1 | 7/2021 | Gunther | |
| 2022/0021728 A1 | 1/2022 | Kelly | |
| 2022/0391409 A1* | 12/2022 | Manjanatha | G06F 3/0617 |
| 2024/0364519 A1* | 10/2024 | Mannur | H04L 9/3213 |

\* cited by examiner

SYSTEM AND METHOD FOR AUTOMATED SYNCHRONIZATION OF DATA

TECHNICAL FIELD

The present disclosure relates generally to networked decentralized computing and, more specifically, to a system and method for automated synchronization of data.

BACKGROUND

Large organizations often utilize complex computing systems, such as data centers, to carry out day-to-day operations. In these systems, many applications and computing devices may be connected by local connections and/or broader networks such as the Internet. The applications and related resources may be decentralized, resulting in inefficiencies such as duplication of functions and/or data. Therefore, there is a need to make these networked computing systems more efficient and reduce the burdens on the computing devices and the network while providing a better experience to the users of the applications.

SUMMARY

The system and method disclosed in the present application provide a technical solution to the technical problems discussed above by providing the capability to automatically perform data verification and synchronization on decentralized applications. The system and method allow data provided or changed at the first application to be used to update the same type of data in other applications without exposing either the other application's data or the first application's other unrelated data. This ensures that all applications that use the same type of data have the most updated data of that type without requiring a user or device to provide the updated data comprising new or changed data separately to each application that uses it. This reduces the amount of computational and network resources used. At the same time, the system and method ensure that unrelated data is not unnecessarily exposed.

In one embodiment, the disclosed system and method synchronize data changes. The system includes a memory configured to store the first application information associated with a first external application and the second application information associated with a second external application. The first application information indicates the types of data used by the first external application, and the second application information indicates the types of data used by the second external application. The system also includes a processor operably coupled to the memory.

The processor receives a notice from a client device that the client device has updated data. The processor may then request metadata related to the updated data from the client device, wherein the metadata indicates at least a type of data associated with the updated data. After the processor receives the metadata related to the updated data, it compares it with the first application information to determine if the first external application uses the data type indicated in the metadata. The processor also compares the metadata with the second application information to determine if the second external application uses the type of data indicated in the metadata. The processor then determines that the first external application uses the type of data indicated in the metadata and determines that the second external application does not use the data type indicated in the metadata. The processor causes the updated data to be communicated to the first external application but not the second external application.

The disclosed system provides several practical applications, such as efficiently updating data across multiple decentralized applications. The disclosed system also determines if a change in a particular piece of data is acceptable based on data type information included in metadata related to the updated data. Further, the disclosed system provides logging for regulatory compliance as well as for troubleshooting and training of the underlying computational devices and applications. By utilizing the disclosed system and method, fewer network resources and computational time need to be used to update the same data type without exposing sensitive or irrelevant data to other applications. These technical advantages improve the underlying computer and network systems by making them more secure and efficient.

Certain embodiments of the present disclosure may include some, all, or none of these advantages. These advantages and other features will be more clearly understood from the following drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

System for Decentralized Computing, Overview

Figure 1:
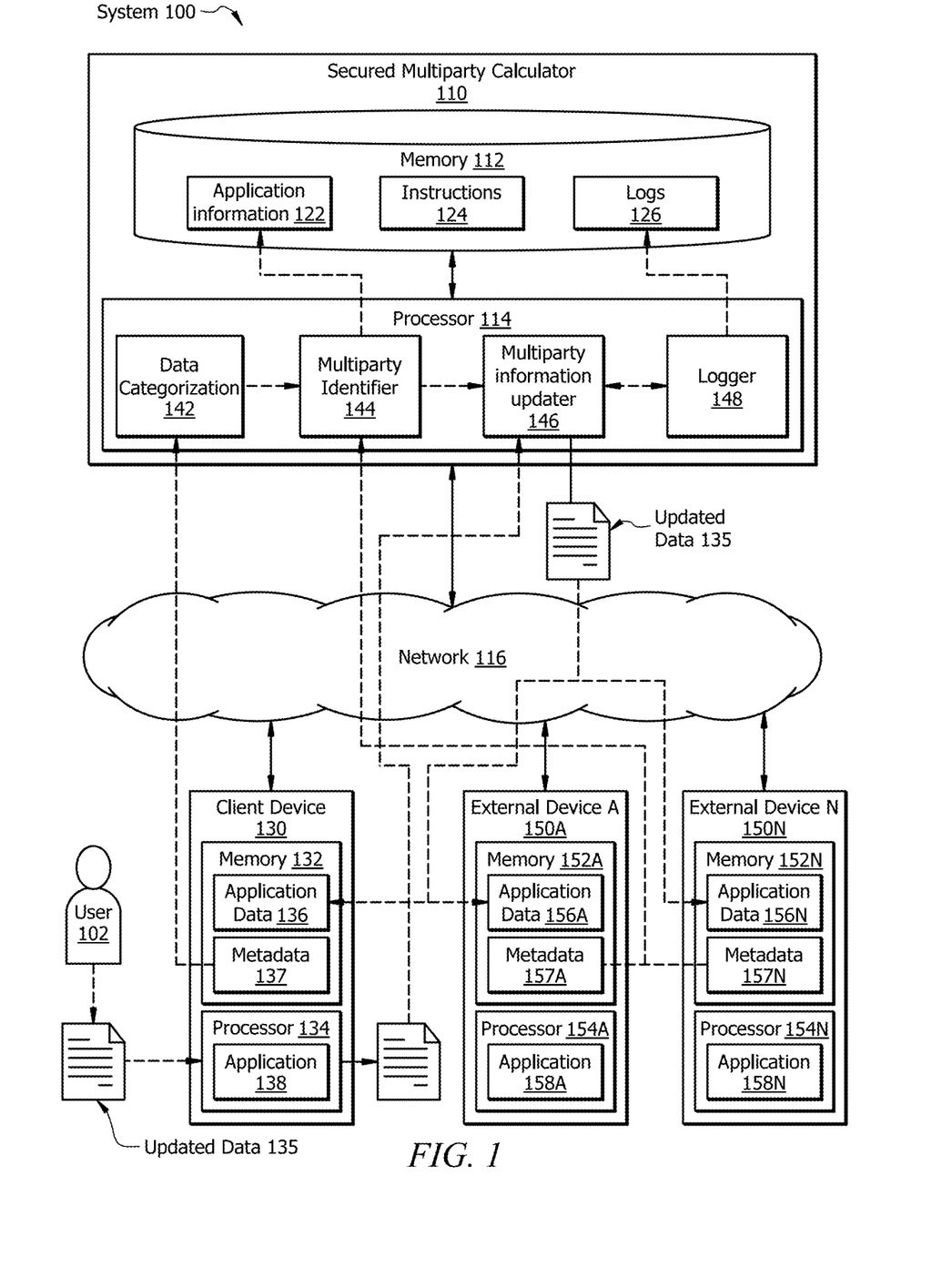
FIG. 1 illustrates one embodiment of a system configured for decentralized computing.

FIG. 1 is a schematic diagram of a system 100 configured to perform decentralized computing. More specifically, system 100 is configured to receive updated data 135 from a user 102. The updated data 135 may comprise new data needed for application 138 or changes to the application data 136 associated with application 138. Using a secured multi-party calculator 110, the system 100 may perform a data categorization operation 142 to determine the type of data that the updated data 135 consists of and compare that type of data to the type(s) of data indicated by metadata 157A-157N related to applications 158A-158N performed by external devices 150A-150N to determine which other application(s) 158A-158N use the same type of data in their application data 156A-156N. When and if another application, e.g., 158A, is determined to use the same type of data, the updated data 135 or part of the updated data 135 as appropriate, may then be sent to the appropriate external device, e.g., 150A to update that application's, e.g., 158A application data, e.g., 156A.

In one embodiment, system 100 comprises a client device 130, at least two external devices 150A-150N, a network 116, and a secured multi-party calculator 110. The secured multi-party calculator 110 includes a processor 114 and a memory 112 in signal communication through a network 116 with client device 130 and the external devices 150A-150N. The system 100 may be configured as shown or in any other suitable configuration.

Client Device

The client device 130 may be any number of devices that interact with a user 102 to perform one or more applications 138. Examples of a client device 130 include but are not limited to, computers, laptops, mobile devices (e.g., smartphones or tablets), servers, clients, automated teller machines (ATM), point of sale devices (POS), or any other suitable type of devices that may be used for accessing or supporting an application 138. The client device 130 includes at least one local processor 134 that performs one or more processes or operations, including application 138 and interacts through network 116 with the secured multi-party calculator 110.

The client device 130 may include at least one local memory 132 for storing instructions used by the processor 134 when performing one or more applications 138 as well as application data 136 related to the application 138. The local memory 132 may be any type of storage for storing instructions (not shown) for executing by the processor 134 as well as application data 136 used by and/or produced by the application 138 and/or user 102. The local memory 132 may be a non-transitory computer-readable medium in operative communication with the processor 134. The local memory 132 may be one or more disks, tape drives, or solid-state drives. Alternatively, or in addition, the local memory 132 may be one or more cloud storage devices. The local memory 132 may be volatile or non-volatile. It may comprise read-only memory (ROM), random-access memory (RAM), ternary content-addressable memory (TCAM), dynamic random-access memory (DRAM), and static random-access memory (SRAM).

Local memory 132 may store other data and instructions related to the operations of the client device 130 and is not limited to the above-described instructions and data. While the application data 136 is shown as residing in the local memory 132 of the client device 130, the application data 136 may reside at a separate location such as, but not limited to, cloud storage, a blockchain, or any other type of storage system that may be accessed by the processor 134 performing an application 138 and may be changed or added to by the user 102 providing updated data 135.

While FIG. 1 shows the client device 130, including a single local processor 134 and a single local memory 132, it may include any suitable number and combination of local processors, e.g., 134, and local memories, e.g., 132, as well as any other necessary components. For simplicity, only one local processor, e.g., 134, and one local memory, e.g., 132, are shown in FIG. 1. Similarly, while only one client device, 130, and a single user, 102, are shown, multiple client devices, e.g., 130, and users, e.g., 102, may be present, each providing updated data 135 to the secured multi-party calculator 110. For simplicity, only one client device, e.g., 130, and one user, e.g., 102, are shown in FIG. 1.

The client device 130 is configured to perform or host one or more applications 138. The one or more applications 138 may include web pages, database applications, banking applications, word processing applications, entertainment applications, video applications, and/or any other applications that may receive updated data 135 from a user 102 and use that updated data 135 along with any stored application data 136 to perform a useful process for the organization.

In general, the one or more applications 138 comprise multiple lines of code which are executed by the processor 134 and allow interactions with the user 102. For example, in a non-limiting example, the various lines of code may cause a graphical user interface (GUI) to be displayed to receive updated data 135 from the user 102. The updated data 135 may include a user's name, address, account number(s), amount, purchase authorization, consent, or any other type of input needed for the processor 134 to perform one or more applications 138. In one or more embodiments, the updated data 135 may be new data not previously stored in the application data 136, or it may be an update or additional information that needs to be included in the application data 136.

In one or more embodiments, when the user 102 provides updated data 135 and/or the application 138 generates updated data 135, the processor 134 analyzes the updated data 135 to generate metadata 137 related to the updated data 135. This metadata 137 is then stored in memory 132. The metadata 137 indicates, among other things, the data type(s) for the data in the changed data. For example, in a non-limiting example, if the user 102 provides an updated address, this data would have an address data type. In another example, if a user 102 provides updated preferences, this may have a preference data type. The data type may be any data type that is useful for the secured multi-party calculator 110 to categorize the data. The metadata 137 may include additional information and/or may take any form without departing from the disclosure.

When updated data 135 is received from the user 102, the processor 134 sends a notice and/or the metadata 137 to the secured multi-party calculator 110. The processor 134 may also or alternatively, send the updated data 135 to the secured multi-party calculator 110 either after the secured multi-party calculator determines that the updated data 135 is used by one or more other applications 158A-158N hosted by one or more external devices 150A-150N.

In one or more optional embodiments, as will be described in more detail with regard to FIGS. 2 and 3, the processor 134 does not change the application data 136 using the updated data 135 until after receiving authorization from the secured multi-party calculator 110. This may be done to ensure that the updated data 135 is not fraudulent and/or a cybersecurity risk. Once processor 134 receives authorization from processor 114, it may implement the updated data 135 in application data 136.

External Devices

The external devices 150A-150N may be any number of devices that perform applications 158A-158N. Examples of external devices 150A-150N include but are not limited to, computers, laptops, mobile devices (e.g., smartphones or tablets), servers, clients, automated teller machines (ATM), point of sale devices (POS), or any other suitable type of devices that may be used for accessing or supporting an application 158A-158N. In one or more embodiments, an external device, e.g., 150A, may be a separate device from the client device 130 and does not communicate directly with the client device 130 and/or one or more other external devices, e.g., 150N. Further, in one or more embodiments, the applications 158A-158N hosted by the external devices 150A-150N may be decentralized applications and/or may not communicate or directly share information with other applications 158A-158N hosted by the external devices 150A-150N and/or the client device 130. In one or more embodiments, the client device 130 is also considered an external device.

Each of the external devices 150A-150N includes at least one local processor 154A-154N that performs one or more processes or operations, including sending metadata 157A-157N associated with application data 156A-156N through the network 116 to the secure multi-party calculator 110. The local processors, 154A-154N, execute instructions stored in the local memory 152A-152N to perform one or more applications, 158A-158N, hosted by the external devices 150A-150N. The one or more applications 156A-156N may include web pages, database applications, banking applications, word processing applications, entertainment applications, video applications, and/or any other applications that an organization may have hosted by one or more nodes 150A-150N.

The external devices 150A-150N may include local memory 152A-152N for storing instructions for performing one or more applications 158A-158N. The local memory 152A-152N may be any type of storage for storing instructions (not shown) for executing by the processor 154A-154N as well as application data 156A-156N used by and/or produced by the applications 158A-158N associated with the external devices 150A-150N. The local memory 152A-152N may be a non-transitory computer-readable medium in operative communication with the processor 154A-154N. The local memory 152A-152N may be one or more disks, tape drives, or solid-state drives. Alternatively, or in addition, the local memory 152A-152N may be one or more cloud storage devices. The local memory 152A-152N may be volatile or non-volatile. It may comprise read-only memory (ROM), random-access memory (RAM), ternary content-addressable memory (TCAM), dynamic random-access memory (DRAM), and static random-access memory (SRAM).

While FIG. 1 shows the external devices 150A-150N each including a single local processor 154A-154N and a single local memory 152A-152N, they may include any suitable number and combination of local processors 154A-154N and local memories 152A-152N as well as any other necessary components. For simplicity, only one local processor, e.g., 154A, and one local memory, e.g., 152A, are shown in FIG. 1.

In general, the applications 158A-158N are each associated with application data 156A-156N stored in the local memory 152A-152N of the external devices 150A-150N. The application data 156A-156N includes metadata 157A-157N, which is used by the secured multi-party calculator 110 to determine the type or types of data associated with the application data 156A-156N. In one or more embodiments, only the metadata 157A-157N is shared with the secured multi-party calculator 110. The application data 156A-156N may be stored utilizing additive secret sharing with none of the external devices 150A-150N and/or the client device 130 having knowledge of what is stored in application data 156A-156N of the other external devices 150A-150N and/or application data 136 of the client device 130.

The application data 156A-156N may include data that is the same type as that in the updated data 135 and may include other data that is not the same type. For example, in a non-limiting example, both the updated data 135 and application data, e.g., 156A, may include data of a user 102 identification type, while application data, e.g., 156A, may also include viewing preference type data not included in the updated data 135.

In one or more embodiments, the local processor, e.g., 154A of a particular external device, e.g., 150A, determines the type(s) of data stored in the application data, e.g., 156A, associated with each application, e.g., 158A, hosted on a particular external device 150A. These data types are stored as metadata, e.g., 157A, which is then sent by the processor, e.g., 154A, through the network 116 to the secured multi-party calculator 110, which performs a multiparty identifier operation 144 to determine based on the sent metadata, e.g., 157A if the application data, e.g., 156A includes matching data types to the data type in the updated data 135. Suppose the updated data 135 includes matching data types to that indicated in the metadata, e.g., 157A. In that case, the processor 114 of the secured multi-party calculator 110 performs a multiparty information updater operation 146 and sends the updated data 135 having the matching data type through the network 116 to the external device 150A to update, supplement, and/or replace the application data, e.g., 156A.

Network

The network 116 may be any suitable type of wireless and/or wired network including, but not limited to, all or a portion of the Internet, an intranet, a private network, a public network, a peer-to-peer network, the public switched telephone network, a cellular network, a local area network (LAN), a metropolitan area network (MAN), a wide area network (WAN), and a satellite network. The network 116 may be configured to support any suitable type of communication protocol as would be appreciated by one of ordinary skill in the art.

The network 116 may connect the client device 130 and the external devices 150A-150N, with the processor 114 and memory 112 of the secured multi-party calculator 110 as part of a local network 116. Alternatively, network 116 may connect the client device 130 and/or the external devices 150A-150N to the secured multi-party calculator 110 through the Internet or other large networks. In one or more embodiments, different elements of system 100 may be at different geographic locations and connected through network 116. While shown as a single network 116, the network 116 may comprise a plurality of components of any suitable networking equipment, including but not limited to routers and switches, that allow at least the client device 130 and external devices 150A-150N to communicate with the secured multi-party calculator 110. Network 116 is not limited to the configuration shown in FIG. 1, which is simply shown in this form for simplicity and explanatory purposes.

Secured Multi-Party Calculator

System 100 may include, among other things, a secured multi-party calculator 110. The secured multi-party calculator 110 is configured to receive updated data 135 from the client device 130 and metadata 157A-157N from the external devices 150A-150N. The secured multi-party calculator 110 performs the operations described in more detail with regards to FIGS. 2 and 3 to determine which external devices 150A-150N to provide the updated data 135 based on the data types indicated in the metadata 157A-157N associated with application data 156A-156N. The multi-party calculator 110 comprises a processor 114 and a memory 112 in signal communication through the network 116 with the client device 130 and external devices 150A-150N. The multi-party calculator 110 may be configured as shown or in any other suitable configuration.

Memory 112 may be any type of storage for storing a computer program comprising instructions 124 and logs 126. The memory 112 may be a non-transitory computer-readable medium in operative communication with the processor 114. The memory 112 may be one or more disks, tape drives, or solid-state drives. Alternatively, or in addition, the memory 112 may be one or more cloud storage devices. The memory 112 may be volatile or non-volatile. It may comprise read-only memory (ROM), random-access memory (RAM), ternary content-addressable memory (TCAM), dynamic random-access memory (DRAM), and static random-access memory (SRAM).

The memory 112 stores instructions 124, which, when executed by the processor 114, causes the processor 114 to perform the operations shown in FIGS. 2 and 3 described below. Instructions 124 may comprise any suitable set of instructions, logic, rules, or code. The memory 112 may include storage that may take the form of a database for storing such things as the logs 126 and/or application information 122. These may be stored and recalled using known protocols such as SQL, XML, and/or any other protocol or language that a user 102, administrator, or developer of the system 100 wishes to use. The logs 126, application information 122, and any other information stored in memory 112 may be stored in different forms, and the disclosure is not limited to storing the logs 126 and application information 122 as a database.

The memory 112 in one or more embodiments stores logs 126. The logs 126, in one or more embodiments, store the results of the multiparty information updater operation 146, as well as decisions if the updated data 135 may be implemented or used to update application data 136 on the client device 130. This information and any other helpful information are stored in the logs 126 when the processor 114 performs a logger operation 148. The information is stored in logs 126 to meet regulatory requirements and keep a record for audits, troubleshooting, debugging, and any other purpose where a record of the changes or updates to application data 136 and 156A-156N are needed. When processor 114 performs operations 142-148 and/or the operation described in FIGS. 2 and 3, information may be stored in the logs 126 for future use.

The processor 114 may take the form of any electronic circuitry including, but not limited to, state machines, one or more central processing unit (CPU) chips, logic units, cores (e.g., a multi-core processor), field-programmable gate array (FPGAs), application specific integrated circuits (ASICs), or digital signal processors (DSPs). The processor 114 may be a programmable logic device, a microcontroller, a microprocessor, or any suitable combination of the preceding. The processor 114 is communicatively coupled to and in signal communication with the memory 112. The one or more processors making up the processor 114 are configured to process data and may be implemented in hardware or software. For example, the processor 114 may be 8-bit, 16-bit, 32-bit, 64-bit, or of any other suitable architecture. The processor 114 may include an arithmetic logic unit (ALU) for performing arithmetic and logic operations, processor registers that supply operands to the ALU and store the results of ALU operations, and a control unit that fetches instructions 124 from memory 112 and executes them by directing the coordinated operations of the ALU, registers and other components.

The processor 114 is in operative communication with memory 112 and configured to implement various instructions 124 stored in memory 112. The processor 114 may be a special-purpose computer designed to implement the instructions 124 and/or functions disclosed herein. For example, the processor 114 may be configured to perform operations, including those described below and shown in FIGS. 2 and 3.

The processor 114 performs a data categorization operation 142, multiparty identifier operation 144, multiparty information updated operation 146, and logger operation 148 based on instructions 124 stored in the memory 112. The processor 114 may perform more or less operations than shown in FIGS. 2 and 3; the specific operations shown are only examples. While a single processor 114 is shown, the processor 114 may include a plurality of processors or computational devices. The operations, e.g., data categorization operation 142, multiparty identifier operation 144, multiparty information updated operation 146, and logger operation 148, described herein as being performed by the processor 114 may be performed by a separate processor 114 or software application executed on a single computational device e.g., processor 114, or they may be located on separate servers, separate datacenters such as a cloud server, client device 130, and/or one or more of the external devices 150A-150N.

The processor 114, in one or more embodiments, receives a notice from a client device 130 via network 116 that the client device 130 has updated data 135. In one or more embodiments, the notice may include and/or be the metadata 137 generated from the updated data 135 and/or the updated data 135 itself. The updated data 135 in one or more embodiments may be new or updated data that updates or adds to application data 136 associated with an application 138 hosted by the client device 130. In one or more embodiments, the updated data 135 may not be associated with an application 138 associated with the client device 130 and may be associated with one or more applications 158A-158N associated with external devices 150A-150N and/or devices separate from the system 100.

Once processor 114 receives a notice, the processor 114 requests and receives from the client device 130 the metadata 137 associated with the updated data 135. The processor 114 then performs a data categorization operation 142 on this metadata 137 to determine the data types and/or categorization of the updated data 135. The processor 114 may also determine if metadata 157A-157N was previously received from the external devices 150A-150N and stored as application information 122. If the metadata 157A-157N has not previously been received, the processor 114 then requests the metadata 157A-157N from the external devices 150A-150N and performs a data categorization operation 142 on that metadata 157A-157N. In one or more embodiments, the processor 114 may instead receive the updated data 135 itself and, during the data categorization operation 142, produce the metadata 137.

Once the data type(s) of the updated data 135 is determined and the data types for applications data 156A-156N are retrieved from application information 122 or generated from received metadata 157A-157N associated with the application data 156A-156N, the processor 114 performs a multiparty identifier operation 144. The multiparty identifier operation 144 determines which applications 158A-158N use the same data type(s) as indicated in the metadata 137 for the updated data 135. The processor 114 then performs the multiparty information updater operation 146 to provide the updated data 135 to the appropriate external devices 150A-150N. For example, if the processor 114 performing the multiparty identifier operation 144 determines from the application information 122 that a first application, e.g., 158A, utilizes a first data type indicated by the metadata 137 for the updated data 135, then the processor 114 performing the multiparty information updater operation 146 causes an appropriate part or all of the updated data 135 to the external device, e.g., 150A. This may comprise the processor 114 requesting the updated data 135 and forwarding it through the network 116 to the external device, e.g., 150A, or it may be by a different means wherein the updated data 135 is forwarded through the network 116 to the external device, e.g., 150A without ever being received by the processor 114. In another example, if processor 114 performing the multiparty identifier operation, 144 determines that a second application, e.g., 158N, does not use the determined data type, then the second external device, e.g., 150N, is not made aware of the updated data 135 and does not receive updated data 135.

Once processor 114 performs the data categorization operation 142, multiparty identifier operation 144, and multiparty information updater operation 146, processor 114 performs the logger operation 148. When performing the logger operation 148, processor 114 may analyze the metadata 137 associated with the updated data 135 and/or the updated data 135 itself, as well as the results of the multipart identifier operation 144 and multiparty information updater operation 146 and make appropriate log entries which are stored in the memory 112 as logs 126. The processor 114 performing the logger operation 148 may also provide data to a user 102, administrator, or other concerned party so that they may analyze if the processor 114 made correct decisions and make appropriate updates to the instructions 124. The processor 114 may also perform other steps required for regulatory purposes and/or the organization that operates system 100.

Figure 2:
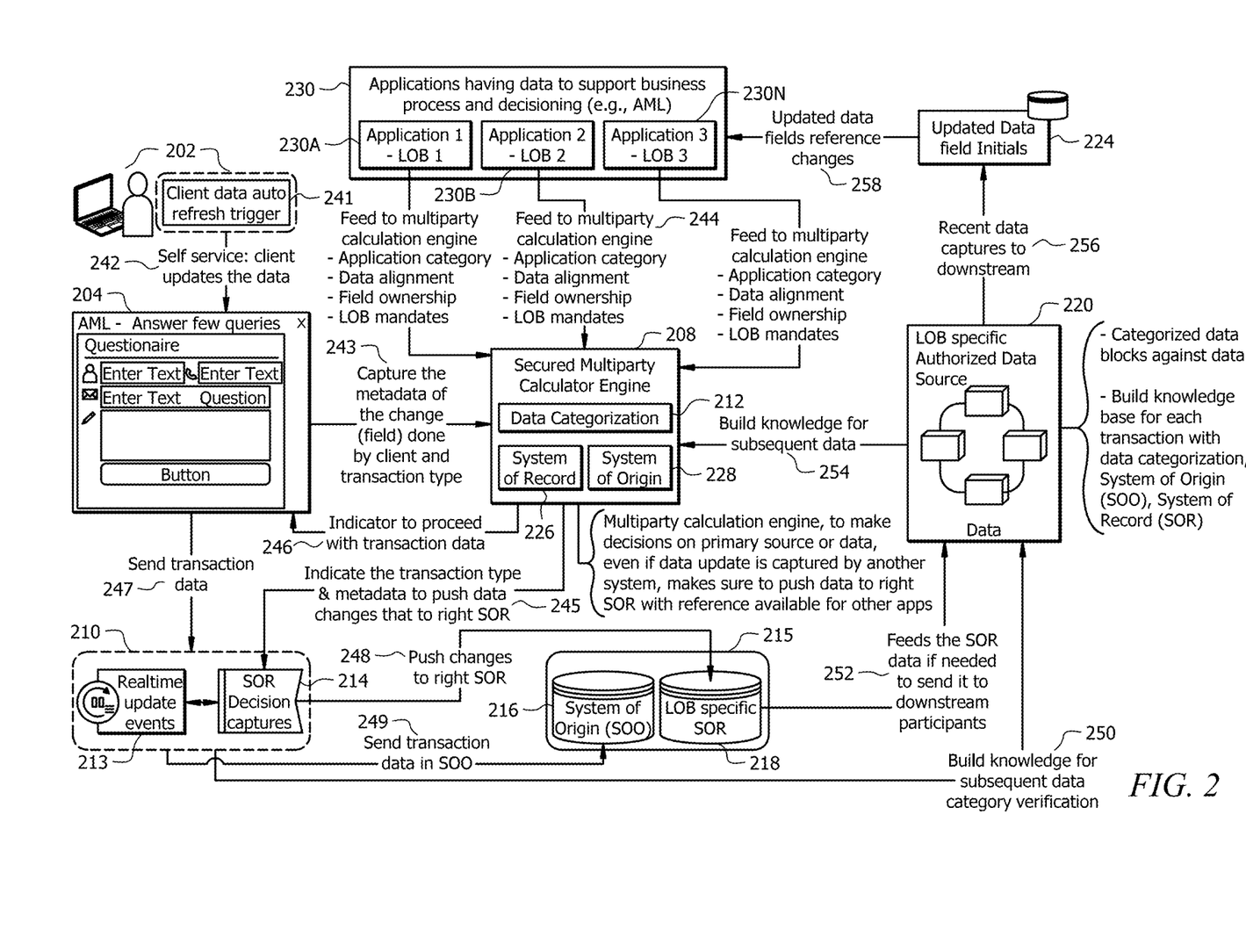
FIG. 2 illustrates one embodiment of an example using a system to perform verification and synchronization on decentralized applications.

Example of Using a Secured Multi-Party Calculator Engine to Perform Verification and Synchronization FIG. 2 is a non-limiting example of a process to update specific applications 230 when a user 202 provides updated or new data. The example of FIG. 2 may be performed by system 100 described above and shown in FIG. 1 or may use any system or components able to perform the example. In the example, user 202 utilizes an interface 204 associated with a system of origin (SOO), such as client device 130, which communicates with a multi-party calculator engine 208. The multi-party calculator engine 208 communicates with the SOO as well as the applications 230 and an analyzer 220. The multi-party calculator engine 208 may update local storage 215 associated with the SOO and specific applications of record (SOR) using data of the same type indicated as being updated by the user 202. The updated storage 215 may include storage 216 related to the SOO as well as storage 218 related to one or more of the applications 230 identified by the secured multi-party calculator engine 208 as having lines of business (LOB) and/or data types related to the data provided by the user 202.

Initially, at operation 241, a user 202 triggers an auto refresh in a user interface 204 of client device 130 or performs a different action that causes the user interface 204 to begin interacting with the user 202. For example, in a non-limiting example, a user 202 may open a web page related to a particular LOB or an application on a user's personal device related to a specific LOB of the organization associated with the user interface 204.

Once user 202 triggers the user interface 204 in operation 241, user 202 in operation 242 provides updated data 135 through interaction with the user interface 204. This may be new data for a new LOB that the user 202 has not previously interacted with or updates to data in a current LOB where the user's information has changed. For example, in a non-limiting example, a user 202 may wish to open a new account with a LOB, and the user 202 would then need to provide name, address, and other identifying information. In a second non-limiting example, user 202 may have recently moved and need to change the address information associated with a particular LOB. The user 202 in operation 242 may provide and/or update any type of information/data needed for any kind of LOB, and the disclosure is not limited to those just described.

Once the user 202 provides the updated or new data in operation 242, the data provided by the user 202 is analyzed to determine if any new or changed data (or fields) has been provided by the user 202. The type of transaction that the user 202 wishes to perform is also determined. For example, the type of transaction may be that the user 202 wishes to open a new account, modify an existing one, or perform any other type of transaction associated with a particular LOB. Once the new or changed data is determined, as well as the transaction type, corresponding metadata is produced and sent to the secured multi-party calculator engine 208 in operation 243.

The secured multi-party calculator engine 208 analyzes data stored for both the SOO 228 and SOR 226. The SOR 226 data is obtained from the applications 230. Specifically, applications 230 may comprise a plurality of applications 230A-230N, and each may be associated with one or more LOBs. Each of the applications 230A-230N may form a SOR 226. In operation 244, information is fed from each of the applications 230A-230N to the secured multi-party calculator engine 208. This information may be any information that is useful in categorizing the data used by a particular application, e.g., 230A. It may also include mandates or regulatory information required by the LOB associated with the particular application, e.g., 230A, as well as ownership information for any field/data where particular fields may be owned or only changed by particular entities or applications. In one or more embodiments, this information in operation 244 may take the form of metadata related to stored data associated with a particular application, e.g., 230A, or it may take any other form. The information may be sent in operation 244 in an encrypted form or in other forms to provide information from the applications 230A-230N as well as from the user interface 204 to the secured multi-party calculator engine 208. The specific form may be any appropriate form and not limited to metadata or encrypted data.

Once the secured multi-party calculator engine 208 receives the information in operation 244 and also receives updated data 135 in operation 243 from user 202, the secured multi-party calculator engine performs a data categorization operation 212. As described in more detail with regards to FIG. 3, this comprises determining from the metadata received in operation 243 the data type of updated data 135 provided by user 202 and comparing it with the data types used by the applications 230A-230N. When the secured multi-party calculator engine 208 determines that an application, e.g., 230A, uses the same data type, that application becomes an SOR 226 for the particular updated data 135.

In one or more embodiments, the secured multi-party calculator engine 208 may also determine if the updated information is valid based on regulatory, cybersecurity, and LOB-specific rules. This may be done along with other components outside the scope of FIG. 2. Once a determination is made that the updated data 135 is valid, such as, for example, a determination that the user 202 is not attempting to commit a fraudulent transaction, the secured multi-party calculator engine 208 sends a notification or other indicator to the user interface 204 and/or client device 130 hosting it, indicating that the transaction may proceed in operation 246. At the same time, an indication and metadata are sent in operation 245 to an updater 210.

The updater 210 receives the updated data 135 in operation 247 and, based on the indication received in operation 245, decides which applications or SORs to update in operation 214 and causes a real-time update event in 213. The real-time update event 213 triggers operations 248 and 249, where the updated data 135 is pushed to storage 218 specific to the appropriate SOR and pushes the updated data 135 in 249 to storage 216 related to the SOO. If the updater 210 does not have access to storage 218 for a specific SOR or all necessary storage 216 for the SOO, the updated data 135 is fed in operation 252 to the downstream or external storage/devices 224 that need the data. Also, in operation 250, a record is made of what changes were made and how that determination was made.

The results of operation 250 and/or 252 are received by an analyzer 220. Analyzer 220 builds a knowledge base of subsequent data categories for use by the secured multi-party calculator engine 208 to perform future data categorization operations 212, in operation 254. The analyzer 220 also forwards data to downstream or external storage/devices 224 in operation 256 and in operation 258. The appropriate applications, e.g., 230A, are updated to use the updated data 135 provided by user 202. Analyzer 220 also produces and stores one or more logs for regulatory and troubleshooting purposes as needed. Operations 241-258 are repeated each time a user 202 provides new or updated data 135. The present examples are to be considered illustrative and not restrictive, and the intention is not to be limited to the details given herein. For example, the various elements or components may be combined or integrated into another system, or certain features may be omitted or not implemented.

Process for Automated Synchronization of Data

Figure 3:
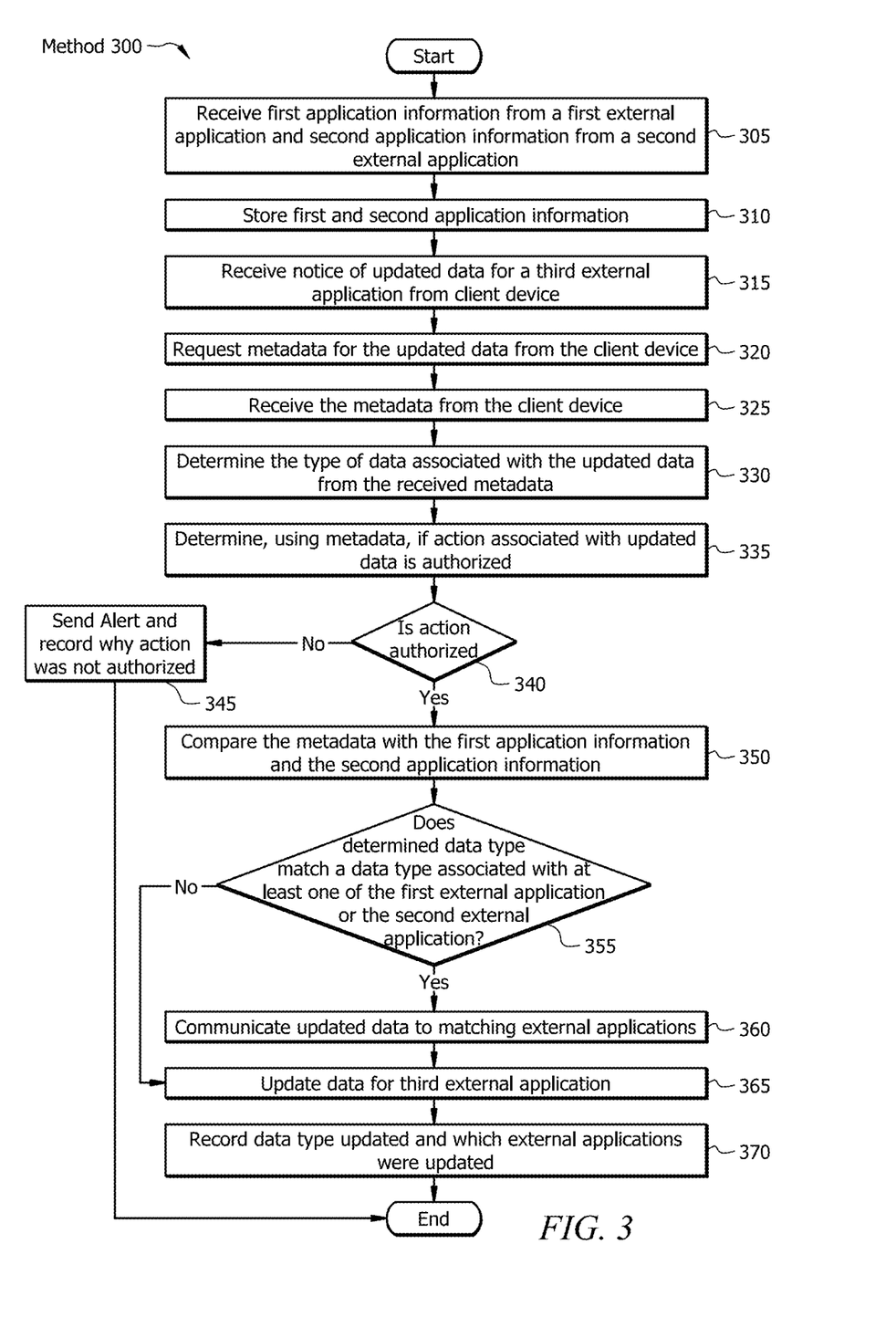
FIG. 3 illustrates one embodiment of a flowchart for synchronization of data.

FIG. 3 is a flowchart of an embodiment of method 300 for performing automated data synchronization by the processor 114. The processor 114 may execute instructions 124 stored in the memory 112, which employs method 300 for synchronizing application data 136 received from a client device 130 with multiple external devices 150A-150N.

Method 300 begins at operation 305, where processor 114 receives first application information, e.g., metadata 157A, from a first external application, e.g., 150A, and second application information, e.g., metadata 157N, from a second external application, e.g., 150N. The information may take any other form and is not limited to metadata, e.g., 157A. Once the first and second application information is received, the information is stored in operation 310 as application information 122 in memory 112.

Either immediately after or sometime later, the processor 114 receives a notice from a client device 130 in operation 315. The notice indicates that updated data 135 for and/or from a third external application, e.g., 136, has been received from a user 102. In one or more embodiments, the third external application, e.g., 136, is hosted by the client device 130. However, the disclosure is not limited to the third external application, e.g., 136, being hosted by a client device 130 and may be hosted by any external device 150A-150N. Further, while described as a client device 130, the device providing notice may be any device external to the secured multi-party calculator 110.

Once notice is received by processor 114, in operation 315, the processor 114, in operation 320, requests metadata 137 for the updated data 135 from the client device 130. In response, the client device 130 produces metadata 137 for the updated data 135, if it has not already been produced, and sends the metadata 137 through the network 116 to the processor 114. In operation 325, the processor 114 receives the metadata 137. In one or more embodiments, other forms of data may be sent, and the disclosure is not limited to metadata 137. Further, in one or more embodiments, the updated data 135 may be analyzed by other devices to produce the metadata 137, and the disclosure is not limited to the client device 130 analyzing the updated data 135.

Once the metadata 137 is received from the client device 130 in operation 325, the processor 114 determines the type of data associated with the updated data 135 using the received metadata 137 in operation 330. From the metadata 137 and/or any other data received from the client device 130 related to the updated data 135, the processor 114 performing a data categorization operation 142 may determine the data type(s) included in the updated data 135. This may be performed by analyzing the fields of the data that are indicated by the metadata 137 to have been changed, a transaction type, and/or any other indication in the metadata 137 that indicates the type of data changed or introduced by the updated data 135. For example, in a non-limiting example, if the user 102 provides rankings for videos in the updated data 135, the corresponding updated data 135 may be determined in operation 330 to have a type of a ranking. In another example, if user 102 updated a name field, the updated data 135 may have a data type of name, identification, or other appropriate data type.

Once the data type or types are determined in operation 330, processor 114 determines in operation 335 if the action associated with the updated data 135 is authorized. The processor 114 determines if the updated data 135 is authorized by analyzing the metadata 137 and determining if the updated data 135 results from fraud or is being performed by a user 102 that does not have permission. For example, if the updated data 135 is related to changing a telephone number, but the metadata 137 indicates that user 102 is located in a country that is different than the address associated with user 102, processor 114 may determine that the updated data 135 is the result, or potentially the result, of an action that is not authorized. Other known means for determining if a transaction or action is authorized may be used, and the disclosure is not limited to those described herein.

If, at operation 340, it is determined that the action is not authorized, then processor 114 may send an alert to the appropriate personnel or systems in operation 345. The processor 114 may also record in the logs 126 why the action was not authorized. Once operation 345 is completed, the method may end. However, if the determination in operation 340 is that the action is authorized, processor 114 proceeds to operation 350.

Once the determination is made that the action is authorized in operation 340, the processor 114 compares the metadata 137 for the updated data 135 with the first application information and the second application information stored in the memory 112 as application information 122. Alternatively, or additionally, the processor 114 compares the metadata 137 for the updated data 135 with metadata 157A-157N or other received information for the external applications 158A-158N. During the comparison, processor 114 determines one or more data types associated with the metadata 137 for the updated data 135 and compares them with the application information 122. From this, the processor 114 may determine in operation 355 if at least one of the first external application, e.g., 158A, and the second external application, e.g., 158N, matches the data type associated with the updated data 135.

If in operation 355 it is determined that at least one of the first external application, e.g., 158A, and second external application, e.g., 158N, matches the data type associated with the updated data 135, in operation 360, the updated data 135 is communicated to the matching external device, e.g., 150A, for the external device, e.g., 150A, to update the appropriate application data, e.g., 156A. In one or more embodiments, the updated data 135, or parts of it, is received from the client device 130. The processor 114 forwards this updated data 135 (or appropriate parts) to the external device, e.g., 150A, and/or the appropriate external storage where the application data, e.g., 156A, is not stored with the same external device, e.g., 150A, that hosts the application, e.g., 158A.

Once operation 360 is completed or if none of the first external application, e.g., 156A, or the second external application, e.g., 156N, matches the data type associated with the updated data 135 in operation 355, the processor 114 notifies the client device 130 to update the client's application data 136. Alternatively, operation 365 may be performed after the determination is made that the action is authorized in operation 340, and operations 350-365 may be performed in any order without departing from the disclosure.

Once operation 365 is completed, the processor 114 in operation 370 records the data type updated and which external applications, e.g., 158A, were updated. This may comprise storing log data in logs 126 or taking any other appropriate form. Any other data regarding the updated data 135 that needs to be retained either for troubleshooting, record keeping, or regulatory reasons may be stored. Once either operation 345 or operation 370 is completed, the method 300 of FIG. 3 ends.

While several embodiments have been provided in the present disclosure, it should be understood that the disclosed systems and methods might be embodied in many other specific forms without departing from the spirit or scope of the present disclosure. The present examples are to be considered illustrative and not restrictive, and the intention is not to be limited to the details given herein. For example, the various elements or components may be combined or integrated into another system, or certain features may be omitted or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

To aid the Patent Office and any readers of any patent issued on this application in interpreting the claims appended hereto, applicants note that they do not intend any of the appended claims to invoke 35 U.S.C. § 140(f) as it exists on the date of filing hereof unless the words "means for" or "operation for" are explicitly used in the particular claim.

The invention claimed is:

1. A system for synchronizing data changes, comprising:
a memory configured to store first application information associated with a first external application and second application information associated with a second external application, wherein the first application information indicates types of data used by the first external application and the second application information indicates types of data used by the second external application; and
a processor operably coupled to the memory and configured to:
receive a notice from a client device that the client device has updated data;
request from the client device, metadata related to the updated data, wherein the metadata indicates at least a type of data associated with the updated data;
receive the metadata related to the updated data;
compare the metadata with the first application information to determine if the first external application uses the type of data indicated in the metadata;
compare the metadata with the second application information to determine if the second external application uses the type of data indicated in the metadata;
determine that the first external application uses the type of data indicated in the metadata;
determine that the second external application does not use the type of data indicated in the metadata; and
cause the updated data to be communicated to the first external application but not the second external application.

2. The system of claim 1, wherein the processor is further configured to:
store in the memory a record of the updated data communicated to the first external application and the type of data associated with the updated data.

3. The system of claim 1, wherein the first external application and the second external application are decentralized applications.

4. The system of claim 1, wherein the updated data is communicated to the first external application using a secure multiparty computation protocol using additive secret sharing.

5. The system of claim 1, wherein the processor is further configured to:
receive first application information from the first external application;
receive second application information from the second external application; and
store the first application information and the second application information in the memory.

6. The system of claim 1, wherein the processor is further configured to:
determine using the metadata if an action associated with the updated data is authorized; and
notify the client device to proceed with the action when it is determined that the action is authorized.

7. The system of claim 6, wherein the action is associated with a third external application not associated with the first external application or the second external application.

8. A method for synchronizing data changes:
receiving a notice from a client device that the client device has updated data;
requesting from the client device, metadata related to the updated data, wherein the metadata indicates at least a type of data associated with the updated data;
receiving the metadata related to the updated data;
comparing the metadata with first application information associated with a first external application to determine if the first external application uses the type of data indicated in the metadata;
comparing the metadata with second application information associated with a second external application to determine if the second external application uses the type of data indicated in the metadata;
determining that the first external application uses the type of data indicated in the metadata;

determining that the second external application does not use the type of data indicated in the metadata; and causing the updated data to be communicated to the first external application but not the second external application.

9. The method of claim 8, further comprising:

storing a record of the updated data communicated to the first external application and the type of data associated with the updated data.

10. The method of claim 8, wherein the first external application and the second external application are decentralized applications.

11. The method of claim 8, wherein the updated data is communicated to the first external application using a secure multiparty computation protocol using additive secret sharing.

12. The method of claim 8, further comprising:

determining using the metadata if an action associated with the updated data is authorized; and notifying the client device to proceed with the action when it is determined that the action is authorized.

13. The method of claim 12, wherein the action is associated with a third external application not associated with the first external application or the second external application.

14. A non-transitory computer-readable medium storing instructions that, when executed by a processor, cause the processor to:

receive a notice from a client device that the client device has updated data;

request from the client device, metadata related to the updated data, wherein the metadata indicates at least a type of data associated with the updated data;

receive the metadata related to the updated data;

compare the metadata with a first application information associated with a first external application to determine if the first external application uses the type of data indicated in the metadata;

compare the metadata with a second application information associated with a second external application to determine if the second external application uses the type of data indicated in the metadata;

determine that the first external application uses the type of data indicated in the metadata;

determine that the second external application does not use the type of data indicated in the metadata; and cause the updated data to be communicated to the first external application but not the second external application.

15. The non-transitory computer-readable medium of claim 14, wherein the instructions further cause the processor to: store in a record of the updated data communicated to the first external application and the type of data associated with the updated data.

16. The non-transitory computer-readable medium of claim 14, wherein the first external application and the second external application are decentralized applications.

17. The non-transitory computer-readable medium of claim 14, wherein the updated data is communicated to the first external application using a secure multiparty computation protocol using additive secret sharing.

18. The non-transitory computer-readable medium of claim 14, wherein the instructions further cause the processor to:

receive first application information from the first external application;

receive second application information from the second external application; and store the first application information and the second application information.

19. The non-transitory computer-readable medium of claim 14, wherein the instructions further cause the processor to:

determine using the metadata if an action associated with the updated data is authorized; and notify the client device to proceed with the action when it is determined that the action is authorized.

20. The non-transitory computer-readable medium of claim 19, wherein the action is associated with a third external application not associated with the first external application or the second external application.

* * * * *